United States Patent
Feigel

(10) Patent No.: US 11,072,314 B2
(45) Date of Patent: Jul. 27, 2021

(54) ELECTRIC BRAKING SYSTEM AND SELF-TEST METHOD USING THE SAME

(71) Applicant: MANDO CORPORATION, Gyeonggi-do (KR)

(72) Inventor: Hans Joerg Feigel, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 170 days.

(21) Appl. No.: 15/981,893

(22) Filed: May 17, 2018

(65) Prior Publication Data

US 2018/0334146 A1  Nov. 22, 2018

(30) Foreign Application Priority Data

May 17, 2017  (KR) .......................... 10-2017-0061154

(51) Int. Cl.
  *B60T 7/04* (2006.01)
  *B60T 13/74* (2006.01)
  (Continued)

(52) U.S. Cl.
  CPC ............... *B60T 7/042* (2013.01); *B60T 8/17* (2013.01); *B60T 8/4081* (2013.01); *B60T 8/90* (2013.01);
  (Continued)

(58) Field of Classification Search
  CPC . B60T 8/17; B60T 8/4081; B60T 8/90; B60T 8/3645; B60T 8/4072;
  (Continued)

(56) References Cited

U.S. PATENT DOCUMENTS

| 10,391,990 B2* | 8/2019 | Kuhlman ................ B60T 7/042 |
| 2004/0222695 A1* | 11/2004 | Miyazaki ............. B60T 8/4081 303/155 |

(Continued)

FOREIGN PATENT DOCUMENTS

| CN | 103038110 | 4/2013 |
| CN | 104136291 | 11/2014 |

(Continued)

OTHER PUBLICATIONS

Office Action dated Aug. 19, 2019 for Chinese Patent Application No. 201810471497.3 and its English machine translation by Google Translate.

(Continued)

*Primary Examiner* — Bradley T King
*Assistant Examiner* — James K Hsiao
(74) *Attorney, Agent, or Firm* — Ladas & Parry, LLP

(57) ABSTRACT

Am electric braking system is disclosed. The electric braking system comprising: a cylinder unit having a first piston connected to a brake pedal, a cylinder chamber with the volume varying by displacement of the first piston, and a pressing chamber with the volume varying by a pressing member, and sending an intention of braking to an electronic control unit; a reservoir storing a working fluid, a pressure applier having a second piston operating by receiving power and a pump chamber with the volume varying by displacement of the second piston, and hydraulically coupled to wheel brakes, a reservoir line connecting the cylinder chamber and the reservoir and having a reservoir valve; and a pump reservoir line connecting the pump chamber and the reservoir and having a dump valve.

15 Claims, 6 Drawing Sheets

(51) Int. Cl.
  *B60T 8/17* (2006.01)
  *B60T 8/40* (2006.01)
  *B60T 13/14* (2006.01)
  *B60T 13/66* (2006.01)
  *B60T 13/68* (2006.01)
  *B60T 17/22* (2006.01)
  *B60T 8/90* (2006.01)
  *B60T 8/36* (2006.01)

(52) U.S. Cl.
  CPC .......... *B60T 13/148* (2013.01); *B60T 13/662* (2013.01); *B60T 13/686* (2013.01); *B60T 13/745* (2013.01); *B60T 17/22* (2013.01); *B60T 8/3645* (2013.01); *B60T 8/4018* (2013.01); *B60T 8/4072* (2013.01); *B60T 2270/404* (2013.01)

(58) Field of Classification Search
  CPC .... B60T 13/148; B60T 13/662; B60T 13/686; B60T 7/042; B60T 2270/404
  See application file for complete search history.

(56) References Cited

U.S. PATENT DOCUMENTS

| | | | | |
|---|---|---|---|---|
| 2007/0152500 | A1* | 7/2007 | Wakabayashi | B60T 7/22 303/155 |
| 2008/0257670 | A1* | 10/2008 | Drumm | B60T 8/4077 188/358 |
| 2008/0258546 | A1* | 10/2008 | Drumm | B60T 7/042 303/115.4 |
| 2009/0079259 | A1* | 3/2009 | Iwasaki | B60T 1/10 303/146 |
| 2012/0053803 | A1* | 3/2012 | Ueno | B60T 8/1708 701/70 |
| 2013/0147259 | A1* | 6/2013 | Linkenbach | B60T 7/042 303/14 |
| 2013/0213025 | A1* | 8/2013 | Linden | B60T 8/4031 60/327 |
| 2014/0203626 | A1* | 7/2014 | Biller | B60T 8/4081 303/10 |
| 2016/0023644 | A1* | 1/2016 | Feigel | B60T 8/4081 303/3 |

FOREIGN PATENT DOCUMENTS

| | | |
|---|---|---|
| CN | 105473396 | 4/2016 |
| CN | 105882639 | 8/2016 |
| CN | 106515697 | 3/2017 |
| CN | 106585589 | 4/2017 |
| EP | 2 520 473 | 11/2012 |

OTHER PUBLICATIONS

Office Action dated May 10, 2021 for Korean Patent Application No. 10-2017-0061154 and its English translation from Global Dossier.

* cited by examiner

ELECTRIC BRAKING SYSTEM AND SELF-TEST METHOD USING THE SAME

CROSS-REFERENCE TO RELATED APPLICATION

This application is based on and claims priority under 35 U.S.C. § 119 to Korean Patent Application No. 10-2017-0061154 filed on May 17, 2017, in the Korean Intellectual Property Office, the disclosure of which is incorporated herein by reference in its entirety.

BACKGROUND

1. Field of the Invention

The present disclosure relates to an electric braking system and self-test method using the same, and more particularly, to an electric braking system that generates braking force using an electric signal corresponding to the pedal displacement and self-test method using the electric braking system.

2. Discussion of Related Art

Braking systems are essentially equipped in vehicles, and various types of braking systems for attaining more robust and stable braking power have recently been proposed.

For example, the braking systems may include an Antilock braking system (ABS) for preventing wheel slippage during braking, a Brake Traction Control System (BTCS) for preventing slippage of driving wheels while the vehicle shoots ahead or races forward, an Electronic Stability Control System (ESC) for keeping the running state of the vehicle stable by controlling brake fluid pressure through a combination of the ABS and BTCS control, and the like.

In general, electric braking systems include actuators for receiving the driver's intention of braking in an electric signal from a pedal displacement sensor which detects displacement of the pedal and applying the pressure to the wheel cylinder.

The electric braking system equipped with the actuator is disclosed in European Patent No. 2 520 473. According to the document, the actuator is configured such that the motor operates by the pedal effort and generates the braking pressure. In this regard, the braking pressure is generated by transforming the rotational force of the motor to a linear motion to press the piston.

REFERENCE

EP 2 520 473 A1 (Honda Motor Co., Ltd.) registered on Nov. 7, 2012

SUMMARY OF THE INVENTION

Embodiments of the present disclosure provide an electric braking system and self-test method using the same, by which the braking pressure is generated using an actuator and a self-test may be efficiently performed.

In accordance with an aspect of the present disclosure, an electric braking system comprising: a cylinder unit having a first piston connected to a brake pedal, a cylinder chamber with the volume varying by displacement of the first piston, and a pressing chamber with the volume varying by a pressing member, and sending an intention of braking to an electronic control unit; a reservoir storing a working fluid; a pressure applier having a second piston operating by receiving power and a pump chamber with the volume varying by displacement of the second piston, and hydraulically coupled to wheel brakes; a reservoir line connecting the cylinder chamber and the reservoir and having a reservoir valve; and a pump reservoir line connecting the pump chamber and the reservoir and having a dump valve.

The electric braking system further comprising: a plurality of inlet lines each connecting the pressure applier to one of the plurality of wheel brakes; and a plurality of outlet lines each connecting one of the plurality of wheel brakes to the reservoir, wherein each inlet line comprises a check valve and an inlet valve allowing one-way flow from the pump chamber to the wheel brake, and each outlet line comprises an outlet valve.

The second piston has the form of a double acting piston, and wherein the pump chamber comprises a first pump chamber located ahead of the second piston and a second pump chamber located behind the second piston.

The pump reservoir line comprises a first pump reservoir line connecting the first pump chamber and the reservoir and having a check valve allowing one-way flow from the reservoir to the first pump chamber, a second pump reservoir line connecting the second pump chamber and the reservoir and having a check valve allowing one-way flow from the reservoir to the second pump chamber, a third pump reservoir line connecting the first pump chamber and the reservoir and having a check valve allowing one-way flow from the first pump chamber to the reservoir, a fourth pump reservoir line connecting the second pump chamber and the reservoir and having a check valve allowing one-way flow from the second pump chamber to the reservoir, and a fifth pump reservoir line in which the third and fourth pump reservoir lines join, connected between the reservoir valve in the reservoir line and the cylinder chamber and having a dump valve.

The pressure applier further comprises a driver providing power to the second piston, wherein the driver comprises a first driver, a second driver, and a first power net connected to the first driver, and a second power net connected to the second driver, and wherein the first and second drivers operate separately The electronic control unit comprises a first electronic control unit connected to the first power net and a second electronic control unit connected to the second power net, and wherein the first and second power nets operate together or selectively.

The electric braking system further comprising: a simulator unit hydraulically coupled to the cylinder unit and providing reaction force corresponding to the pedal effort of the brake pedal, wherein the simulator unit comprises a housing, a simulator chamber coupled to the cylinder chamber, a third piston contained in the housing and changing the volume of the simulator chamber according to the displacement, an elastic member applying elastic force to the third piston, and a sealing member sealing the simulator chamber.

The reservoir valve comprises a first reservoir valve and a second reservoir valve, and wherein the reservoir line comprises a first reservoir line connecting the cylinder chamber and the reservoir and having the first reservoir valve, a second reservoir line connecting the cylinder chamber and the reservoir and having a check valve allowing one-way flow from the reservoir to the cylinder chamber, and a third reservoir line connecting the pressing chamber, the simulator unit, and the reservoir, and having a check valve arranged in parallel with the second reservoir valve to allow one-way flow from the reservoir to the pressing chamber or from the reservoir to the simulator unit with the second reservoir valve. The electric braking system of claim 1, further comprising: a pedal displacement sensor configured to transmit an electric signal to the electronic control unit by detecting displacement of the brake pedal.

The electric braking system further comprising: a circuit fluid pressure sensor configured to detect a fluid pressure applied to the wheel brake.

The dump valve comprises a first dump valve and a second dump valve, and wherein the pump reservoir line comprises a first pump reservoir line connecting the first pump chamber and the reservoir and having a check valve allowing one-way flow from the reservoir to the first pump chamber, a second pump reservoir line connecting the second pump chamber and the reservoir and having a check valve allowing one-way flow from the reservoir to the second pump chamber, a third pump reservoir line connecting the first pump chamber and the reservoir and having a check valve allowing one-way flow from the first pump chamber to the reservoir and the first dump valve regulating two-way flows, a fourth pump reservoir line connecting the second pump chamber and the reservoir and having a check valve allowing one-way flow from the second pump chamber to the reservoir, and a fifth pump reservoir line in which the third and fourth pump reservoir lines join, connected between the reservoir valve in the reservoir line and the cylinder chamber and having the second dump valve regulating two-way flows.

An electric braking system comprising: a cylinder unit having a first piston connected to a brake pedal, a cylinder chamber with the volume varying by displacement of the first piston, a second piston dividing the cylinder chamber into a first cylinder chamber and a second cylinder chamber, and a pressing chamber with the volume varying by a pressing member, and sending an intention of braking to an electronic control unit; a reservoir storing a working fluid; a pressure applier having a second piston operating by receiving power and a pump chamber with the volume varying by displacement of the second piston, and hydraulically coupled to wheel brakes; a reservoir line connecting the cylinder chamber and the reservoir and having a reservoir valve; and a pump reservoir line connecting the pump chamber and the reservoir and having a dump valve.

The electric braking system further comprising: a first cylinder line connecting the first cylinder chamber and the wheel brake and having a check valve allowing one-way flow from the first cylinder chamber to the wheel brake; and a second cylinder line connecting the second cylinder chamber and the wheel brake and having a check valve allowing one-way flow from the second cylinder chamber to the wheel brake.

A self-test method using the electric braking system, operating the second piston of the pressure applier while keeping the inlet valve, the outlet valve, and the reservoir valve closed and the dump valve open; and monitoring measurements of pressure applied to the pump chamber and position of the second piston while the second piston is operating and performing air detection by comparing the measurements with reference values.

A self-test method using the electric braking system, operating the second piston of the pressure applier while keeping the inlet valve, the outlet valve, and the reservoir valve closed and the dump valve open; having the pressure applied to the pump chamber reach a set pressure and moving the second piston to a set position; and re-operating the second piston after the lapse of a predetermined time, monitoring measurements of pressure applied to the pump chamber and position of the second piston, and determining whether a working fluid leaks by comparing the measurements with reference values.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
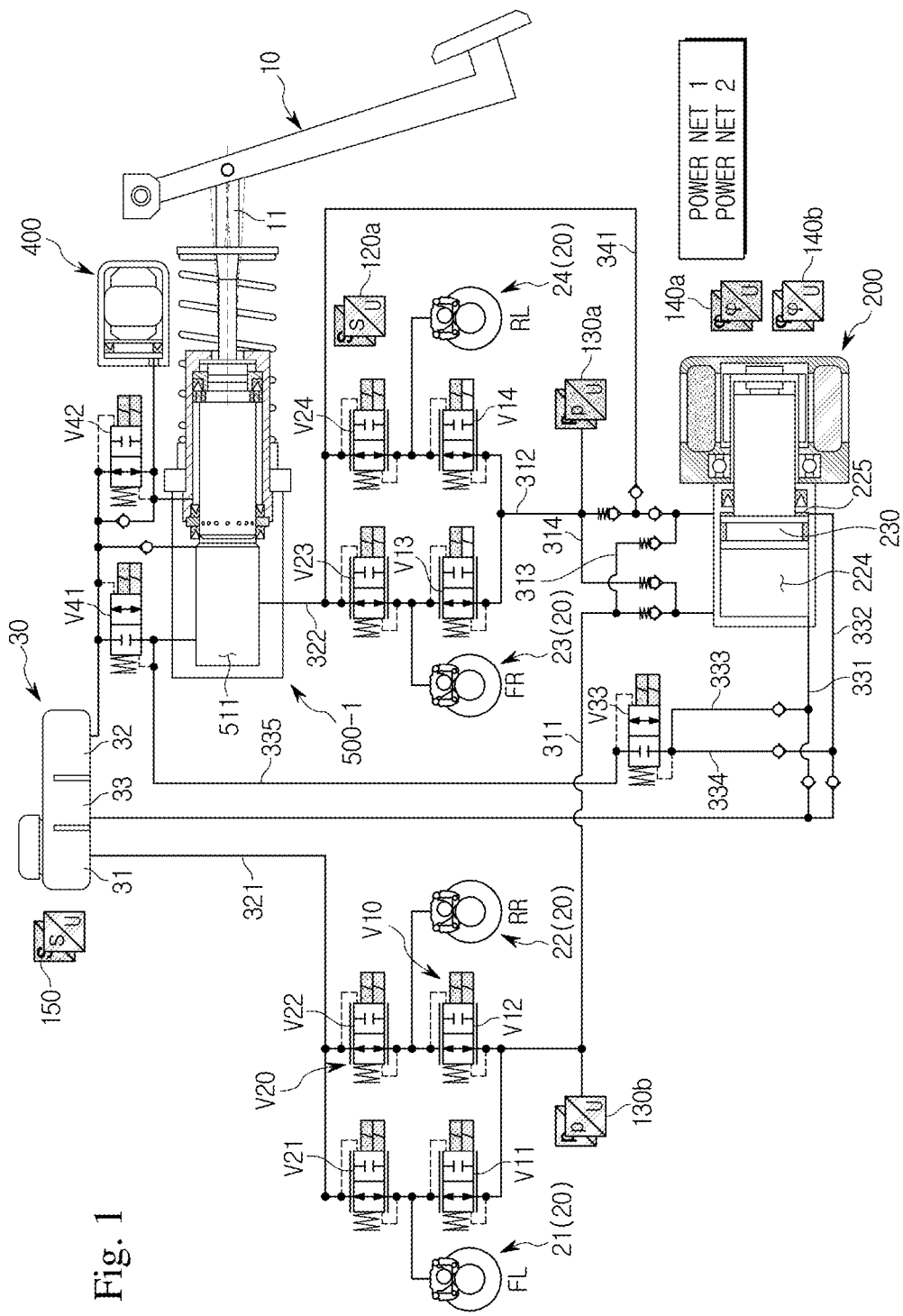
FIG. 1 shows an electric braking system, according to a first embodiment of the present disclosure.

Reference will now be made in detail to embodiments, examples of which are illustrated in the accompanying drawings. Embodiments as will be described below are suggested to fully deliver an idea of the present disclosure to ordinary skilled people in the art. The present disclosure may not be limited thereto but may be implemented in any other forms. In the drawings, well-known or unrelated components may be omitted for clarity and conciseness, and some components may be exaggerated in terms of their dimensions for better understanding.

Figure 2:
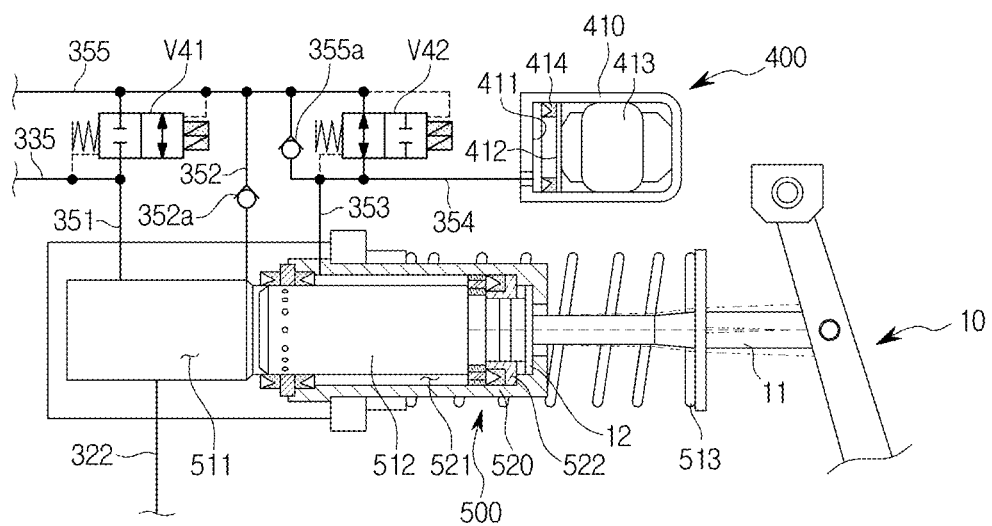
FIG. 2 is an enlarged view of a cylinder unit of the electric braking system, according to the first embodiment of the present disclosure.
Figure 3:
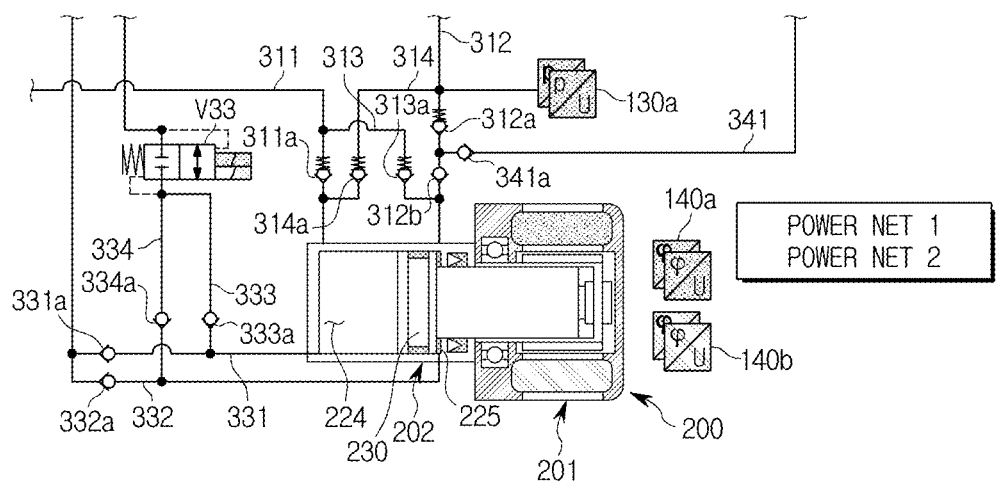
FIG. 3 is an enlarged view of the periphery of a pressure applier, according to the first embodiment of the present disclosure.

FIG. 1 shows an electric braking system, according to a first embodiment of the present disclosure, FIG. 2 is an enlarged view of a cylinder unit 500 of the electric braking system, according to the first embodiment of the present disclosure, and FIG. 3 is an enlarged view of the periphery of a pressure applier 200, according to the first embodiment of the present disclosure.

Referring to FIGS. 1 to 3, in the first embodiment, an electric braking system may be provided to include the cylinder unit 500 for sending an intention of braking to an electronic control unit (ECU), a reservoir 30 for storing a working fluid, a pressure applier 200 hydraulically coupled to wheel brakes 20, a normally closed reservoir valve V41, a reservoir line 351 connecting a cylinder chamber 51 of the cylinder unit 500 and the reservoir 30, a normally closed dump valve V31, and a pump reservoir line 335 branching from pump chambers 224, 225 of the pressure applier 200 to the cylinder chamber 511 and the reservoir valve V41.

The wheel brake 20 may include a caliper pressed by the working fluid and a wheel to be braked by the caliper. The wheel brake 20 brakes the wheel when pressed by the working fluid sent thereto, producing a braking force for the vehicle. The reservoir 30, a means to store the working fluid therein and supply the working fluid to the braking system, may have the form of a storage having an inlet formed on the top to further receive the working fluid from outside. The wheel brakes 20 may include first to fourth wheel brakes 21, 22, 23, and 24, one of which corresponds to one of front left (FL), front right (FR), rear left (RL), and rear right (RR) wheel brakes located on the left and right sides of the front and rear wheels of the vehicle.

The wheel brakes 20 may be connected to first and second power nets, which operate separately, and may be provided to have an Integrated Parking Brake (IPB) type in which the wheel brake 20 and a parking brake, which are selectively operated by the ECU, are integrated.

The reservoir 30 may include first and second reservoir chambers 31 and 32 coupled to a pair of hydraulic circuits S1 and S2, respectively, and third reservoir chamber 33 located between the first and second reservoir chambers 31 and 32 and connected to the pump chambers 224, 225 of the pressure applier 200.

The pressure applier 200 includes a driver 201 and a piston pump unit 202 operated by the power from the driver 201. The driver 201 generates power from an electric signal from a pedal displacement sensor 120a, and the piston pump unit 202 generates a fluid pressure from the power to provide a braking pressure to the wheel brakes FR, FL, RR, RL.

The pedal displacement sensor 120a detects a displacement of the pedal 10 and sends it to the ECU in an electric signal. The ECU analyzes the electric signal from the pedal displacement sensor 120a to figure out a braking pressure required by the driver, and outputs a signal to control the piston pump unit 202 and various valves accordingly.

The driver 201 includes a motor to produce rotational force from the power supplied. The motor may generate the rotational force forward or backward according to a signal output from the ECU. The rotational angular speed and the rotation angle of the motor may be controlled accurately. The motor is well-know to the public, so the detailed description thereof will be omitted herein.

The piston pump unit 202 may have the form of a double acting piston. That is, it may include a first pump chamber 224 located ahead of the piston and a second pump chamber 225 located behind the piston. The first and second pump chambers 224 and 225 may be coupled to one or more wheel brakes FR, FL, RR, RL for providing the fluid pressure thereto, and whether the fluid pressure of the chamber is used to provide the braking pressure to the wheel brake FR, FL, RR, RL or vacuum of the chamber is used to release the braking pressure may be determined by the ECU controlling the peripheral valves.

A pedal operator 400, 500 may include the cylinder unit 500, a simulator unit 400 hydraulically coupled to the cylinder unit 500 for providing the reaction force corresponding to the pedal effort. The cylinder unit 500 may include a first piston 512 coupled to the pedal, the cylinder chamber 511, and a pressing chamber 521 with varying volume by a pressing member 522.

The simulator unit 400 may include a housing 410, a simulator chamber 411 coupled to the cylinder chamber 511, a piston 412 contained in the housing 410 for contracting or expanding the simulator chamber 411, an elastic member 413 for applying elastic force to the piston 412, and a sealing member 414 for sealing the simulator chamber 411.

The first piston 512 may be coupled to the pedal 10 via an input rod 11 to receive forward force in a direction of contraction of the cylinder chamber 511, and the pressing member 522 may receive forward force in a direction in which the pressing chamber 521 is contracted by an engaging jaw 12 provided on the input rod 11. Accordingly, forward-backward movement of the first piston 512 and the pressing member 522 may be separately performed.

The cylinder unit 500 may include a pedal spring 513 coupled to the input rod 11 to provide a retraction force for the first piston 512, and the pressing member 522 may be pressed and retracted by the first piston 512 when the first piston 512 is retracted.

A braking pressure regulator 300 may largely includes inlet lines 311, 312, 313 and 314 connecting the pump chambers 224 and 225 and the wheel brakes 20, outlet lines 314 connecting the wheel brakes 20 and the reservoir 30, and pump reservoir lines 331, 332, 333 and 334 connecting the reservoir 30 and the pump chambers 210 and 220. Specifically, each of the wheel brakes 20 includes an inlet line 310 equipped with analog-operated normally open inlet valves V10 and connecting the pressure applier 200 and the four wheel brakes 20, and outlet lines 320 equipped with analog-operated normally open outlet valves V20 and connecting the four wheel brakes 20 and the reservoir 30 directly or indirectly. The inlet valves V10 may include first to fourth inlet valves V11, V12, V13 and V14, and the outlet valve V20 may include first to fourth outlet valves V21, V22, V23 and V24.

The inlet line 310 may include a first inlet line 311 allowing one-way flow from the first pump chamber 224 to the inlet valves V11 and V12 of the first hydraulic circuit S1 through a check valve 311a, a second inlet line 312 allowing one-way flow from the second pump chamber 225 to the inlet valves V13 and V14 of the second hydraulic circuit S2 through a check valve 312a, a third inlet line 313 allowing one-way flow from the second pump chamber 225 to the inlet valves V11 and V12 of the first hydraulic circuit S1 through a check valve 313a, and a fourth inlet line 314 allowing one-way flow from the first pump chamber 224 to the inlet valves V13, V14 of the second hydraulic circuit S2 through a check valve 314a.

The first check valve 312a and a second check valve 312b may be provided in the second inlet line 312 connected from the pressure applier to the inlet valves V13 and 14, and they are connected in series to prevent a back flow. A check valve 341a may be provided in a first cylinder line 341 connected from the cylinder chamber 511 and going between the first check valve 312a and the second check valve 312b to prevent a back flow.

The check valves 311a, 312a, 313a and 314a provided in the inlet lines 310 may remain in the state of being pressed by the elastic force to prevent leakage from the first pump chamber 224 or the second pump chamber 225 to the wheel brakes 20.

The outlet lines 320 may include first and second outlet lines 321 and 322. The first outlet line 321 may connect the first and second outlet valves V21 and V21 and the reservoir 30, and the second outlet line 322 may connect the third and fourth outlet valves V23 and V24 and the reservoir 30.

The inlet valve V10 and the outlet valve V20 may be operated as coils or sets of coils, and connected to two different power nets such that when one of the power nets malfunctions, the inlet valve V10 and the outlet valve V20 may be operated by the other power net. With the inlet valve V10 and the outlet valve V20 connected to the two different power nets, simultaneous shutdown due to malfunctioning may be prevented. That is, the simultaneous shutdown is prevented because electrical operation of the inlet valve V10 and electrical operation of the outlet valve V20 are separate from each other.

A pump reservoir line 330 may largely include a first pump reservoir line 331 having a check valve 331a to allow one-way flow from the reservoir 30 to the first pump chamber 224, a second pump reservoir line 331 having a check valve 332a to allow one-way flow from the reservoir 30 to the second pump chamber 225, a third pump reservoir line 333 having a check valve 333a to allow one-way flow from the first pump chamber 224 to the reservoir 30, and a fourth pump reservoir line 334 having a check valve 334a to allow one-way flow from the second pump chamber 225 to the reservoir 30.

There is a fifth pump reservoir line 335 having a dump valve V33 located where the third and fourth pump reservoir lines 333 and 334 join. With the single third dump valve V33, flows of the working fluid flowing in the fourth and fifth pump reservoir lines 334 and 335 are regulated.

Furthermore, a first reservoir line 351 may connect the cylinder chamber 511 and the reservoir 30, and a second reservoir line 352 may connect the reservoir 30 and the cylinder chamber 511 and include a check valve 352a to allow one-way flow between the reservoir 30 and the cylinder chamber 511. A normally closed first reservoir valve V41 may be installed in the first reservoir line 351.

A third outlet line 323 may connect the cylinder chamber 511 and the third and fourth outlet valves V23 and V24, and the first cylinder line 341 may be connected to the cylinder chamber 511 and the third and fourth inlet valves V13 and V14.

The third reservoir line 353 may branch into a fourth reservoir line 354 connecting the pressing chamber 521 and the simulator unit 400 and a fifth reservoir line 355 connecting the pressing chamber 521 and the reservoir 30. The fifth reservoir line 355 may have a check valve 355a and a second reservoir valve V42 connected in parallel.

Circuit fluid pressure sensors 130a and 130b may be provided to detect fluid pressure. For example, the circuit fluid pressure sensors 130a and 130b may include a first circuit fluid pressure sensor 130a connected to the first and second wheel brakes 21 and 22 for detecting the fluid pressure and a second circuit fluid sensor 130b connected to the third and fourth wheel brakes 23 and 24 for detecting the fluid pressure. The circuit fluid pressure sensors 130a and 130b may be located between the first and second pump chambers 224 and 225 of the pressure applier 200 and the inlet valve V10.

Driver displacement sensors 140a and 140b may be provided to detect the displacement of the driver 201. For example, the driver displacement sensors 140a and 140b may detect rotation angles of the motor 210. Alternatively, the driver displacement sensors 140a and 140b may detect one of the current, voltage, and torque of the driver 201.

A reservoir displacement sensor 150 may be provided to detect a water level of the reservoir 300.

In the meantime, the ECU may have a redundancy function. For this, the driver 201 may include the first and second power nets connected to first and second drivers, respectively. The first and second drivers may be stators of the motor, which operate according to separate signals.

The ECU may include a first ECU connected to the first power net and a second ECU connected to the second power net. The second power net may be configured to operate selectively and separately from or together with the first power net. Accordingly, if the second power net operates selectively and separately from the first power net, the driver 201 may continue to operate with operation of the second power net according to a signal from the second ECU even if the first ECU is malfunctioning. Even if, on the contrary, the second ECU is malfunctioning, the driver 201 may continue to operate with operation of the first power net according to a signal from the first ECU.

Furthermore, the ECU may block the signal from the first ECU if the first ECU is malfunctioning and allow the second power net to operate according to the signal from the second ECU, thereby preventing malfunction of the driver 201. On the contrary to this, the ECU may block the signal from the second ECU if the second ECU is malfunctioning and allow the first power net to operate according to the signal from the first ECU, thereby preventing malfunction of the driver 201.

One or more of the electric valves controlled by the ECU may include two coils coupled to the first and second ECUs, respectively. One of the two coils is operated by the second ECU while the first ECU malfunctions, and the other is operated by the first ECU while the second ECU malfunctions.

A self-test method using the electric braking system according to the first embodiment will be performed as follows: First, a self-test method for air detection may be performed to determine whether air is detected by operating the piston of the pressure applier 200 while keeping the inlet valve V10, the outlet valve V20, and the reservoir valve V41 closed but the dump valve V33 open, monitoring measurements of the pressure applied to the pump chambers 224 and 225 and position of the piston while the piston is operating, and comparing the measurements with reference values.

A self-test method for detection of working fluid leakage may be performed to determine whether the working fluid leaks by operating the piston of the pressure applier 200 while keeping the inlet valve V10, the outlet valve V20, and the reservoir valve V41 closed but the dump valve V33 open, operating the piston 230 again a certain time after the pressure applied to the pump chambers 224, 225 reaches a set pressure or the piston 230 is moved to a set position, monitoring measurements of the pressure applied to the pump chambers 224 and 225 and the position of the piston 230, and comparing the measurements with reference values.

In other words, the pressure of the hydraulic circuit and the position of the piston 230 may be detected by sensors while the pressure is produced, and the air in the braking system may be detected in a pressurized state in which the piston 230 rises past the set stroke. The leakage may be detected by operating the piston 230 to be positioned for the hydraulic circuit to be pressed to a first set value s1 and operating the piston 230 again, after the lapse of first time t1, to press the hydraulic circuit to a second set value s2.

This test may meet an equation, e.g., $(s2-s1)*a/t=Q$. In other words, a leakage ratio Q of the working fluid may be calculated by multiplying a difference in stroke between the second set value s2 and the first set value s1 with the cross-section a of the piston 230 and dividing the multiplication by the first time t1. The leakage ratio Q calculated from the test may be determined whether it passes the test by determining whether the leakage ratio Q exceeds a predetermined value. Accordingly, a self-test for detecting a leakage of air or working fluid may be performed by connecting the outlet port of the dump valve V33 of the pressure applier 200 to the cylinder chamber 511 of the cylinder unit 500 without pressing the wheel brakes 20.

Figure 4:
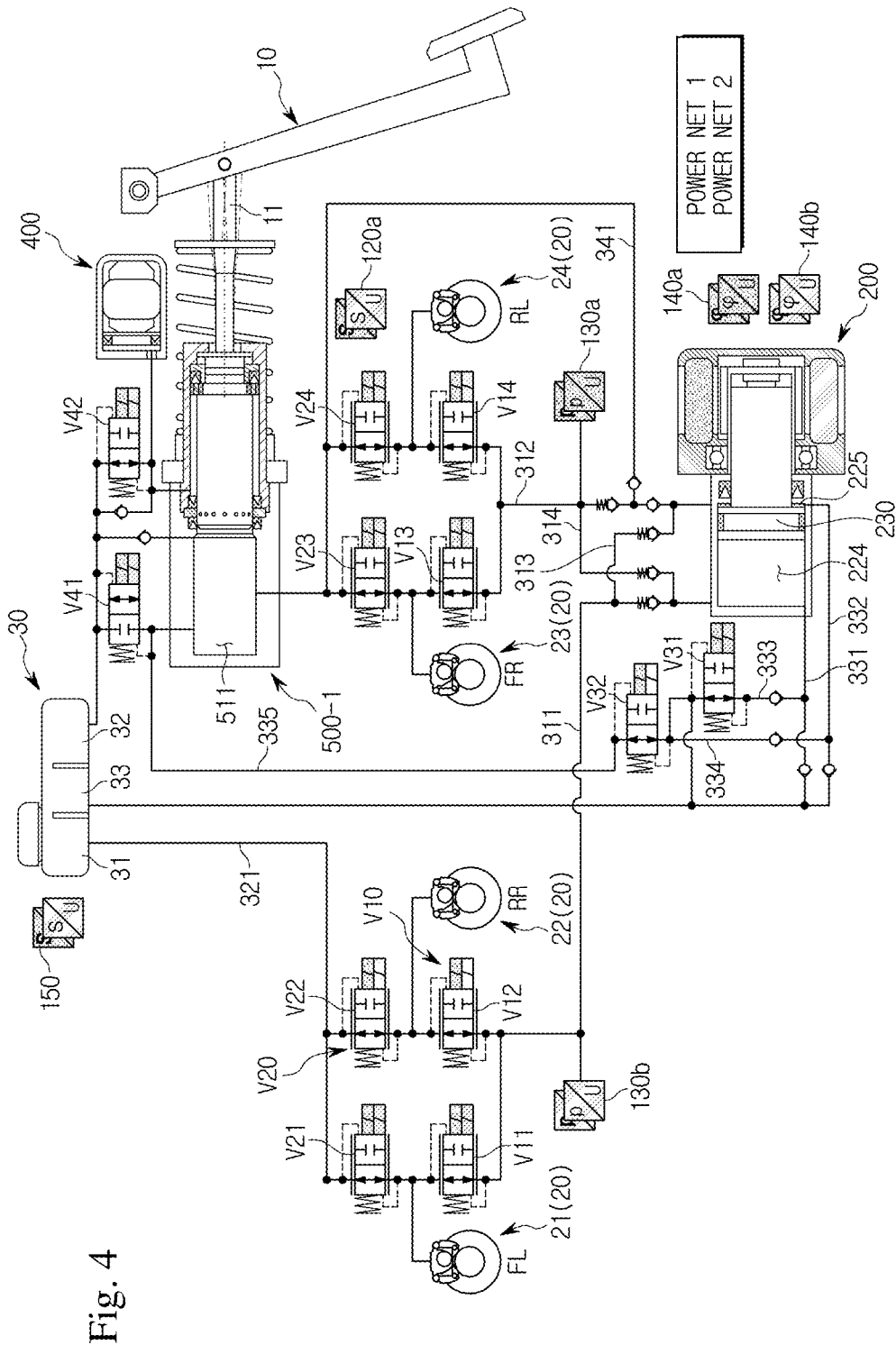
FIG. 4 shows an electric braking system, according to a second embodiment of the present disclosure.

FIG. 4 shows an electric braking system, according to a second embodiment of the present disclosure. Overlapping explanation will not be repeated in describing the following embodiments.

In the second embodiment, there are two dump valves. For example, a first dump valve V31 may be provided in the third pump reservoir line 333 and the second dump valve V32 may be provided in the fourth pump reservoir line 334, making the first and second pump chambers 224 and 225 connected to but hydraulically separated from the reservoir 30.

Figure 5:
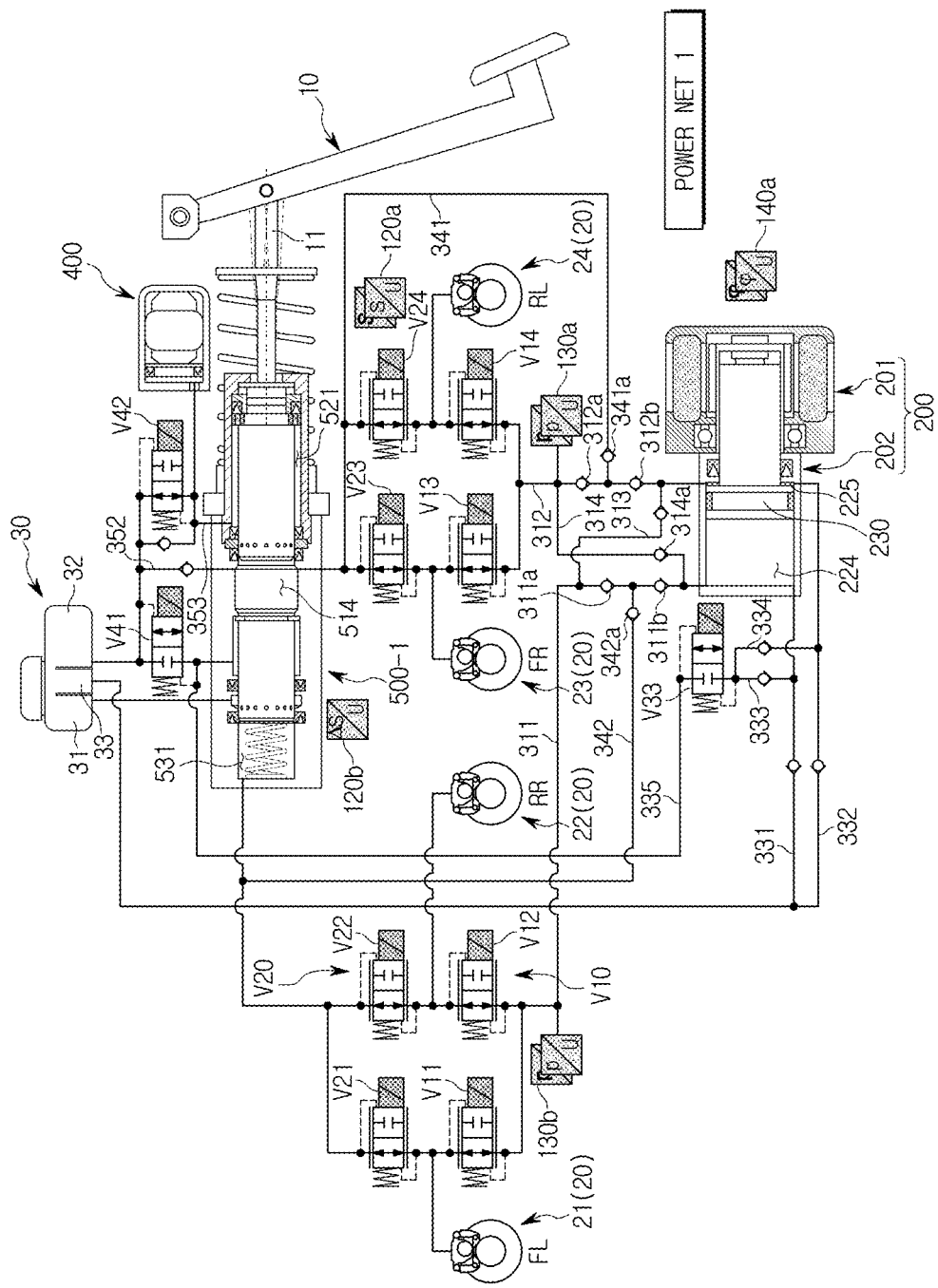
FIG. 5 shows an electric braking system, according to a third embodiment of the present disclosure.
Figure 6:
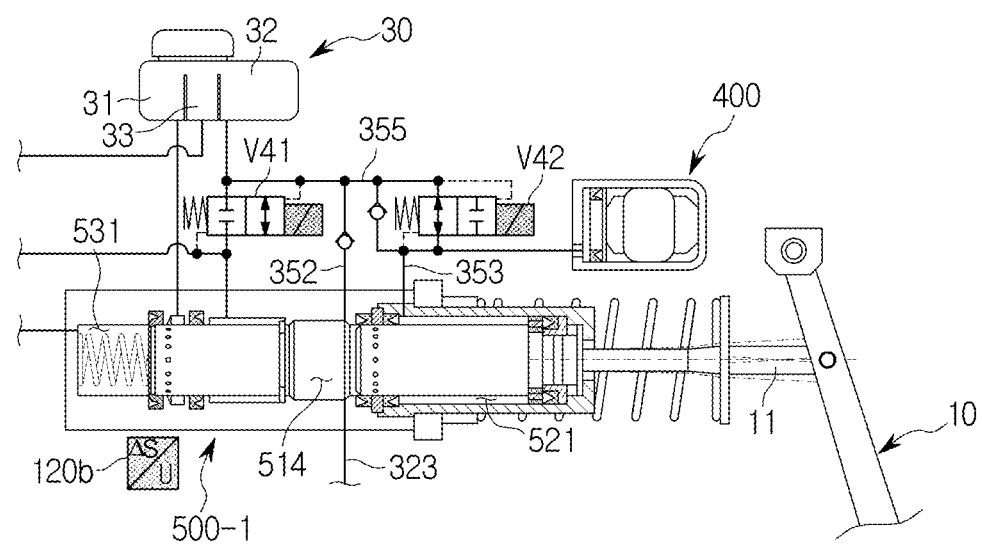
FIG. 6 is an enlarged view of a cylinder unit of the electric braking system, according to the third embodiment of the present disclosure.

FIG. 5 shows an electric braking system, according to a third embodiment of the present disclosure, and FIG. 6 is an enlarged view of a cylinder unit 500-1 of the electric braking system, according to the third embodiment of the present disclosure. Referring to FIGS. 5 and 6, in the third embodiment, a second piston 532 may be further provided to divide the cylinder chamber into a first cylinder chamber 514 and a second cylinder chamber 531. The first cylinder chamber 514 may be connected to the third and fourth wheel brakes 23 and 24 through the third outlet line 323 or the first cylinder line 341, and the second cylinder chamber 531 may be connected to the first and second wheel brakes 21 and 22 through the fourth outlet line 324 or the second cylinder line 342.

The first check valves 311a, 312a and second check valves 311b and 312b may be installed in the first inlet line 311 and the second inlet line 312 to prevent a back flow from the pressure applier 200. The check valve 341a may be provided in the first cylinder line 341 connected from the first cylinder chamber 514 and going between the first and second check valves 312a and 312b of the second inlet line 312 to prevent a back flow to the first cylinder chamber 514, and a check valve 342a may be provided in the second cylinder line 342 connected from the second cylinder chamber 531 and going between the first and second check valves 311a and 311b of the first inlet line 311 to prevent a back flow to the second cylinder chamber 531.

According to embodiments of the present disclosure, a self-test may be performed to detect a leakage of air or working fluid without pressing the wheel brake by coupling an outlet port of a dump valve of a pressure applier to a cylinder chamber of a cylinder unit.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An electric braking system comprising:
   a cylinder unit having a first piston connected to a brake pedal, a cylinder chamber with the volume varying by displacement of the first piston, and a pressing chamber with the volume varying by a pressing member, and sending an intention of braking to an electronic control unit;
   a reservoir storing a working fluid;
   a pressure applier having a second piston and a pump chamber with the volume varying by displacement of the second piston, the pressure applier hydraulically coupled to wheel brakes;
   a first reservoir line connecting the cylinder chamber of the cylinder unit and the reservoir and having at least one reservoir valve;
   a second reservoir line connecting the reservoir, the pressing chamber of the cylinder unit and a simulator unit, wherein the simulator unit is hydraulically coupled to the pressing chamber of the cylinder unit and configured to provide reaction force corresponding to pedal effort of the brake pedal;
   a pump reservoir line connecting the pump chamber and the reservoir and having a dump valve;
   a plurality of inlet lines each connecting the pressure applier to one of the wheel brakes; and
   a plurality of outlet lines each directly or indirectly connecting one of the wheel brakes to the reservoir,
   wherein each inlet line comprises a check valve and an inlet valve allowing one-way flow from the pump chamber to the wheel brake, and each outlet line comprises an outlet valve,
   wherein the second piston has the form of a double acting piston,
   wherein the pump chamber comprises a first pump chamber located ahead of the second piston and a second pump chamber located behind the second piston,
   wherein the plurality of outlet lines comprise a first outlet line connected with the cylinder chamber, and
   wherein at least one of the wheel brakes is connected with the reservoir through the first outlet line, the cylinder chamber of the cylinder unit, and the first reservoir line connecting the cylinder chamber of the cylinder unit and the reservoir.

2. The electric braking system of claim 1, wherein the pump reservoir line comprises
   a first pump reservoir line connecting the first pump chamber and the reservoir and having a check valve allowing one-way flow from the reservoir to the first pump chamber,
   a second pump reservoir line connecting the second pump chamber and the reservoir and having a check valve allowing one-way flow from the reservoir to the second pump chamber,
   a third pump reservoir line connecting the first pump chamber and the reservoir and having a check valve allowing one-way flow from the first pump chamber to the reservoir,
   a fourth pump reservoir line connecting the second pump chamber and the reservoir and having a check valve allowing one-way flow from the second pump chamber to the reservoir, and
   a fifth pump reservoir line in which the third and fourth pump reservoir lines join, connected between the reservoir valve in the reservoir line and the cylinder chamber and having a dump valve.

3. The electric braking system of claim 1, wherein the pressure applier further comprises a driver providing power to the second piston,
   wherein the driver comprises a first driver, a second driver, and a first power net connected to the first driver, and a second power net connected to the second driver, and
   wherein the first and second drivers operate separately.

4. The electric braking system of claim 3, wherein the electronic control unit comprises a first electronic control unit connected to the first power net and a second electronic control unit connected to the second power net, and
   wherein the first and second power nets operate together or selectively.

5. The electric braking system of claim 1,
   wherein the simulator unit comprises a housing, a simulator chamber coupled to the cylinder chamber, a third piston contained in the housing and changing the volume of the simulator chamber according to the displacement, an elastic member applying elastic force to the third piston, and a sealing member sealing the simulator chamber.

6. The electric braking system of claim 5, wherein the at least one reservoir valve comprises a first reservoir valve and a second reservoir valve, wherein the reservoir line comprises a third reservoir line connecting the cylinder chamber and the reservoir and having a check valve allowing one-way flow from the reservoir to the cylinder chamber,
wherein the first reservoir line has the first reservoir valve, and
the second reservoir line has a check valve arranged in parallel with the second reservoir valve to allow one-way flow from the reservoir to the pressing chamber or from the reservoir to the simulator unit with the second reservoir valve.

7. The electric braking system of claim 1, further comprising: a pedal displacement sensor configured to transmit an electric signal to the electronic control unit by detecting displacement of the brake pedal.

8. The electric braking system of claim 1, further comprising: a circuit fluid pressure sensor configured to detect a fluid pressure applied to the wheel brake.

9. The electric braking system of claim 1, wherein the dump valve comprises a first dump valve and a second dump valve, and
wherein the pump reservoir line comprises
a first pump reservoir line connecting the first pump chamber and the reservoir and having a check valve allowing one-way flow from the reservoir to the first pump chamber,
a second pump reservoir line connecting the second pump chamber and the reservoir and having a check valve allowing one-way flow from the reservoir to the second pump chamber,
a third pump reservoir line connecting the first pump chamber and the reservoir and having a check valve allowing one-way flow from the first pump chamber to the reservoir and the first dump valve regulating two-way flows,
a fourth pump reservoir line connecting the second pump chamber and the reservoir and having a check valve allowing one-way flow from the second pump chamber to the reservoir, and
a fifth pump reservoir line in which the third and fourth pump reservoir lines join, connected between the reservoir valve in the reservoir line and the cylinder chamber and having the second dump valve regulating two-way flows.

10. The electric braking system of claim 1, wherein the pressing chamber is formed around a circumferential surface of the first piston.

11. An electric braking system comprising:
a cylinder unit having a first piston connected to a brake pedal, a cylinder chamber with the volume varying by displacement of the first piston, a second piston dividing the cylinder chamber into a first cylinder chamber and a second cylinder chamber, and a pressing chamber with the volume varying by a pressing member, and sending an intention of braking to an electronic control unit;
a reservoir storing a working fluid;
a pressure applier having a third piston and a pump chamber with the volume varying by displacement of the third piston, the pressure applier hydraulically coupled to wheel brakes;
a first reservoir line connecting the cylinder chamber of the cylinder unit and the reservoir and having at least one reservoir valve;
a second reservoir line connecting the reservoir, the pressing chamber of the cylinder unit and a simulator unit, wherein the simulator unit is hydraulically coupled to the pressing chamber of the cylinder unit and configured to provide reaction force corresponding to pedal effort of the brake pedal;
a pump reservoir line connecting the pump chamber and the reservoir and having a dump valve;
a plurality of inlet lines each connecting the pressure applier to one of the wheel brakes; and
a plurality of outlet lines each indirectly connecting one of the wheel brakes to the reservoir,
wherein each inlet line comprises a check valve and an inlet valve allowing one-way flow from the pump chamber to the wheel brake, and each outlet line comprises an outlet valve,
wherein the second piston has the form of a double acting piston,
wherein the pump chamber comprises a first pump chamber located ahead of the second piston and a second pump chamber located behind the second piston, and
wherein the wheel brakes are connected with the outlet lines and the reservoir through at least one of the cylinder chamber of the cylinder snit and the first reservoir line connecting the cylinder chamber of the cylinder unit and the reservoir.

12. The electric braking system of claim 11, further comprising:
a first cylinder line connecting the first cylinder chamber and the wheel brake and having a check valve allowing one-way flow from the first cylinder chamber to the wheel brake; and
a second cylinder line connecting the second cylinder chamber and the wheel brake and having a check valve allowing one-way flow from the second cylinder chamber to the wheel brake.

13. The electric braking system of claim 11, wherein the pressing chamber is formed around a circumferential surface of the first piston.

14. A self-test method using an electric braking system comprising a cylinder unit having a first piston connected to a brake pedal, a cylinder chamber with the volume varying by displacement of the first piston, and a pressing chamber with the volume varying by a pressing member, and sending an intention of braking to an electronic control unit; a reservoir storing a working fluid; a pressure applier having a second piston and a pump chamber with the volume varying by displacement of the second piston, the pressure applier hydraulically coupled to wheel brakes; a reservoir line connecting the cylinder chamber and the reservoir and having a reservoir valve; and a pump reservoir line connecting the pump chamber and the reservoir and having a dump valve, the method comprising:
operating the second piston of the pressure applier while keeping the inlet valve, the outlet valve, and the reservoir valve closed and the dump valve open; and
monitoring measurements of pressure applied to the pump chamber and position of the second piston while the second piston is operating and performing air detection by comparing the measurements with reference values.

15. The self-test method using the electric braking system according to claim 14, further comprise:
having the pressure applied to the pump chamber reach a set pressure and moving the second piston to a set position; and
re-operating the second piston after the lapse of a predetermined time, and determining whether a working fluid leaks by comparing the measurements with reference values.

* * * * *